(12) United States Patent
Liu et al.

(10) Patent No.: US 12,323,349 B2
(45) Date of Patent: Jun. 3, 2025

(54) REMAINING MINIMUM SYSTEM INFORMATION IN A DISCOVERY REFERENCE SIGNAL FOR SIDELINK IN AN UNLICENSED BAND

(71) Applicant: QUALCOMM Incorporated, San Diego, CA (US)

(72) Inventors: Chih-Hao Liu, San Diego, CA (US); Jing Sun, San Diego, CA (US); Yisheng Xue, San Diego, CA (US); Xiaoxia Zhang, San Diego, CA (US); Giovanni Chisci, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 492 days.

(21) Appl. No.: 17/662,011

(22) Filed: May 4, 2022

(65) Prior Publication Data

US 2023/0361954 A1 Nov. 9, 2023

(51) Int. Cl.
*H04L 5/00* (2006.01)

(52) U.S. Cl.
CPC .......... *H04L 5/0048* (2013.01); *H04L 5/0064* (2013.01)

(58) Field of Classification Search
CPC ... H04L 5/0048; H04L 5/0064; H04L 5/0094; H04L 5/0053
See application file for complete search history.

(56) References Cited

U.S. PATENT DOCUMENTS

| | | | |
|---|---|---|---|
| 2021/0168574 A1* | 6/2021 | Zhang | H04W 4/40 |
| 2022/0053428 A1 | 2/2022 | Hwang et al. | |
| 2023/0254702 A1* | 8/2023 | Damnjanovic | H04W 28/0967 |
| | | | 455/501 |
| 2023/0354311 A1* | 11/2023 | Xue | H04L 1/1822 |

FOREIGN PATENT DOCUMENTS

| | | |
|---|---|---|
| WO | 2021207961 A1 | 10/2021 |
| WO | 2021217549 A1 | 11/2021 |
| WO | 2021237654 A1 | 12/2021 |

OTHER PUBLICATIONS

International Search Report and Written Opinion—PCT/US2023/020115—ISA/EPO—Jul. 19, 2023.

* cited by examiner

*Primary Examiner* — Afshawn M Towfighi
(74) *Attorney, Agent, or Firm* — Harrity & Harrity, LLP

(57) ABSTRACT

Various aspects of the present disclosure generally relate to wireless communication. In some aspects, a user equipment (UE) may transmit a sidelink synchronization signal block (S-SSB) in a slot. The UE may transmit remaining minimum system information (RMSI) associated with the S-SSB, wherein the RMSI is transmitted in a physical sidelink shared channel (PSSCH) that is multiplexed with the S-SSB in the slot. Numerous other aspects are described.

26 Claims, 13 Drawing Sheets

REMAINING MINIMUM SYSTEM INFORMATION IN A DISCOVERY REFERENCE SIGNAL FOR SIDELINK IN AN UNLICENSED BAND

FIELD OF THE DISCLOSURE

Aspects of the present disclosure generally relate to wireless communication and to techniques and apparatuses for remaining minimum system information (RMSI) in a discovery reference signal (DRS) for sidelink in an unlicensed band (SL-U).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting a sidelink synchronization signal block (S-SSB) in a slot. The method may include transmitting remaining minimum system information (RMSI) associated with the S-SSB, wherein the RMSI is transmitted in a physical sidelink shared channel (PSSCH) that is multiplexed with the S-SSB in the slot.

Some aspects described herein relate to a method of wireless communication performed by a UE. The method may include receiving an S-SSB in a slot. The method may include receiving RMSI associated with the S-SSB, wherein the RMSI is received in a PSSCH that is multiplexed with the S-SSB in the slot.

Some aspects described herein relate to a UE for wireless communication. The UE may include a memory and one or more processors coupled to the memory. The one or more processors may be configured to transmit an S-SSB in a slot. The one or more processors may be configured to transmit RMSI associated with the S-SSB, wherein the RMSI is transmitted in a PSSCH that is multiplexed with the S-SSB in the slot.

Some aspects described herein relate to a UE for wireless communication. The UE may include a memory and one or more processors coupled to the memory. The one or more processors may be configured to receive an S-SSB in a slot. The one or more processors may be configured to receive RMSI associated with the S-SSB, wherein the RMSI is received in a PSSCH that is multiplexed with the S-SSB in the slot.

Some aspects described herein relate to a non-transitory computer-readable medium that stores a set of instructions for wireless communication by a UE. The set of instructions, when executed by one or more processors of the UE, may cause the UE to transmit an S-SSB in a slot. The set of instructions, when executed by one or more processors of the UE, may cause the UE to transmit RMSI associated with the S-SSB, wherein the RMSI is transmitted in a PSSCH that is multiplexed with the S-SSB in the slot.

Some aspects described herein relate to a non-transitory computer-readable medium that stores a set of instructions for wireless communication by a UE. The set of instructions, when executed by one or more processors of the UE, may cause the UE to receive an S-SSB in a slot. The set of instructions, when executed by one or more processors of the UE, may cause the UE to receive RMSI associated with the S-SSB, wherein the RMSI is received in a PSSCH that is multiplexed with the S-SSB in the slot.

Some aspects described herein relate to an apparatus for wireless communication. The apparatus may include means for transmitting an S-SSB in a slot. The apparatus may include means for transmitting RMSI associated with the S-SSB, wherein the RMSI is transmitted in a PSSCH that is multiplexed with the S-SSB in the slot.

Some aspects described herein relate to an apparatus for wireless communication. The apparatus may include means for receiving an S-SSB in a slot. The apparatus may include means for receiving RMSI associated with the S-SSB, wherein the RMSI is received in a PSSCH that is multiplexed with the S-SSB in the slot.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
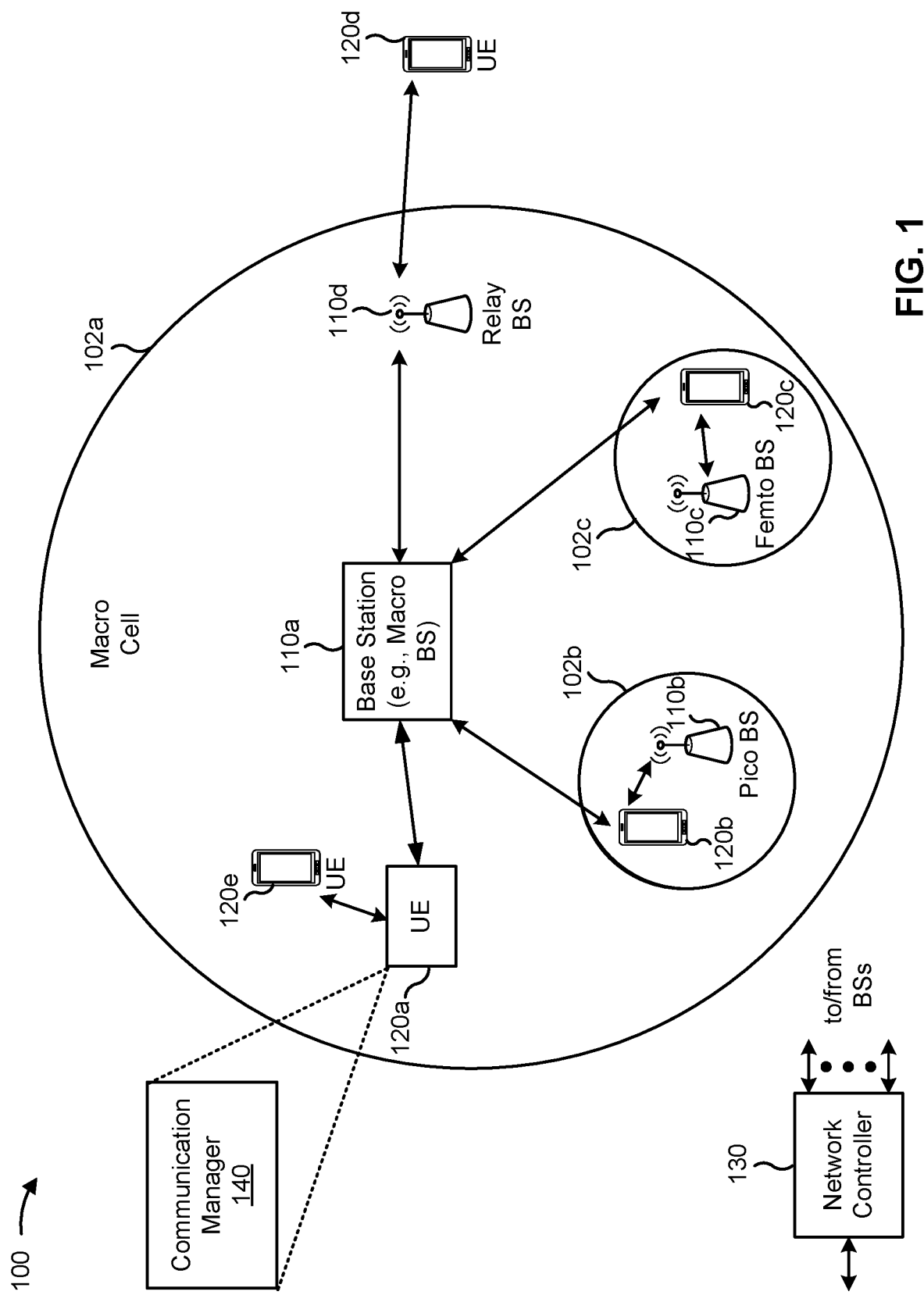
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network node" or "network entity" may refer to an aggregated base station, a disaggregated base station (e.g., described in connection with FIG. 9), an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), TRP, or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit a sidelink synchronization signal block (S-SSB) in a slot; and transmit RMSI associated with the S-SSB, wherein the RMSI is transmitted in a PSSCH that is multiplexed with the S-SSB in the slot.

In some aspects, the UE 120 may include a communication manager 140. As described in more detail elsewhere herein, the communication manager 140 may receive an S-SSB in a slot; and receive RMSI associated with the S-SSB, wherein the RMSI is received in a PSSCH that is multiplexed with the S-SSB in the slot. Additionally, or alternatively, the communication manager 140 may perform one or more other operations described herein.

As indicated above, FIG. 1 is provided as an example. Other examples may differ from what is described with regard to FIG. 1.

Figure 2:
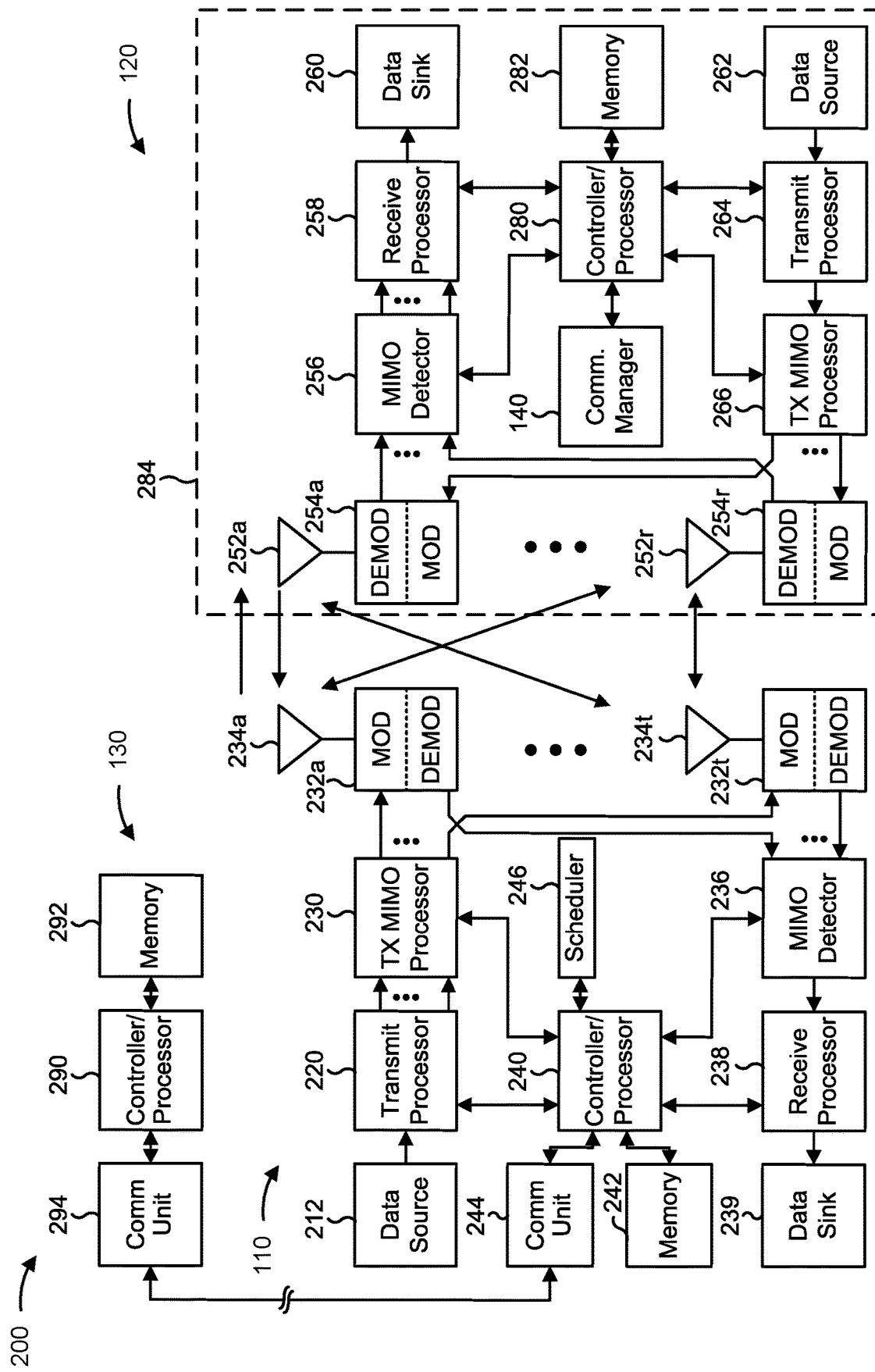
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7A-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7A-10).

The controller/processor 240 of the base station 110, the controller/processor 280 of the UE 120, and/or any other component(s) of FIG. 2 may perform one or more techniques associated with RMSI in a DRS for SL-U, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE (e.g., UE 120) includes means for transmitting an S-SSB in a slot; and/or means for transmitting RMSI associated with the S-SSB, wherein the RMSI is transmitted in a PSSCH that is multiplexed with the S-SSB in the slot. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE (e.g., UE 120) includes means for receiving an S-SSB in a slot; and/or means for receiving RMSI associated with the S-SSB, wherein the RMSI is received in a PSSCH that is multiplexed with the S-SSB in the slot. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
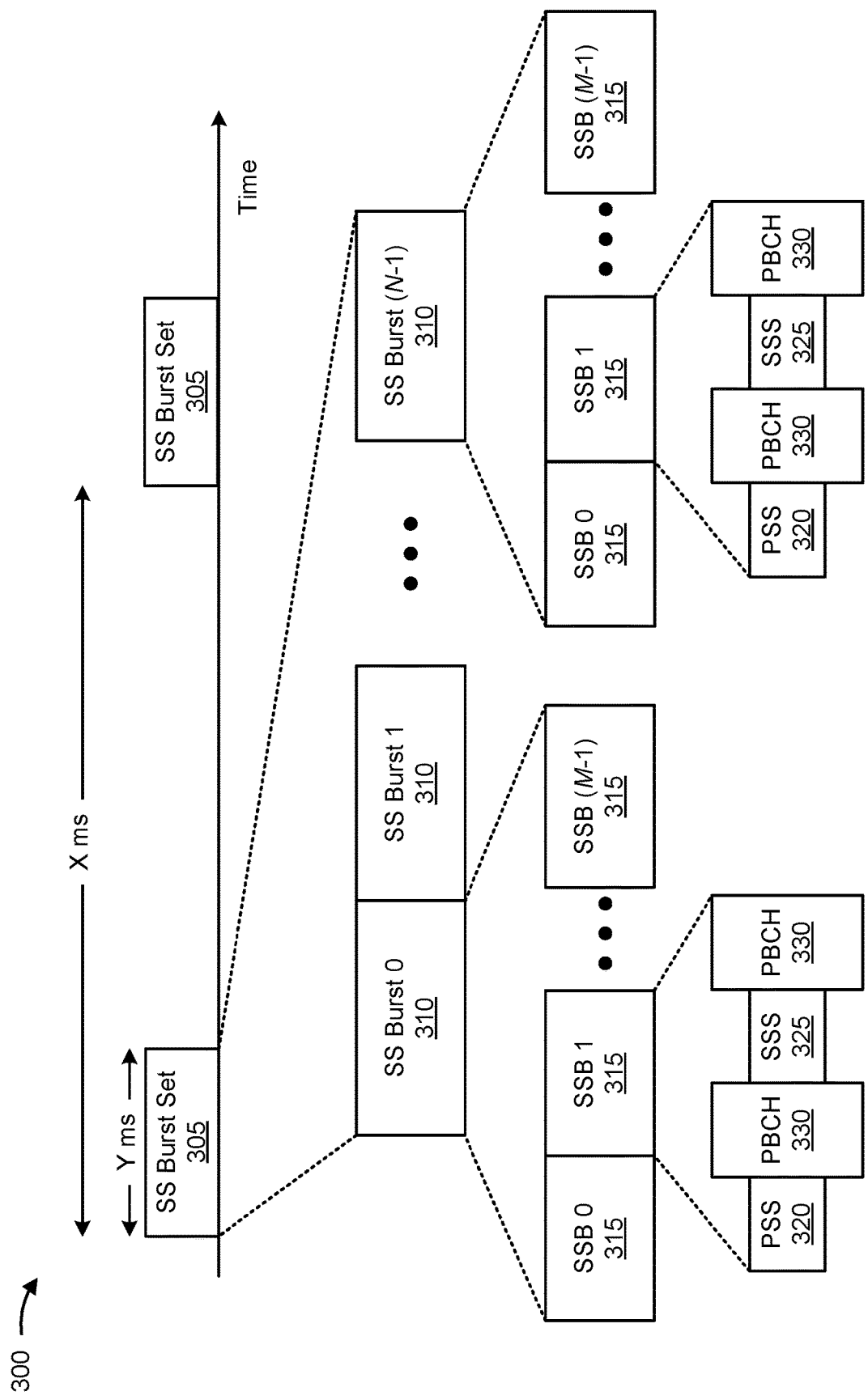
FIG. 3 is a diagram illustrating an example of a synchronization signal (SS) hierarchy, in accordance with the present disclosure.

FIG. 3 is a diagram illustrating an example 300 of a synchronization signal (SS) hierarchy, in accordance with the present disclosure. As shown in FIG. 3, the SS hierarchy may include an SS burst set 305, which may include multiple SS bursts 310, shown as SS burst 0 through SS burst N−1, where N is a maximum number of repetitions of the SS burst 310 that may be transmitted by the base station. An SS burst 310 may in some aspects be referred to as a discovery reference signal (DRS) burst. As further shown, each SS burst 310 may include one or more SS blocks (SSBs) 315, shown as SSB 0 through SSB M−1, where M is a maximum number of SSBs 315 that can be carried by an SS burst 310. An SSB 315 may in some aspects be referred to as a DRS. In some aspects, different SSBs 315 may be beam-formed differently (e.g., transmitted using different beams), and may be used for cell search, cell acquisition, beam management, and/or beam selection (e.g., as part of an initial network access procedure). An SS burst set 305 may be periodically transmitted by a wireless node (e.g., base station 110), such as every X milliseconds, as shown in FIG. 3. The periodicity of the SS burst set 305 may in some aspects be referred to as a DRS period. In some aspects, an SS burst set 305 may have a fixed or dynamic length, shown as Y milliseconds in FIG. 3. The length of the SS burst set 305 may in some aspects be referred to as a DRS window or an SSB measurement time configuration (SMTC) window.

In some aspects, an SSB 315 may include resources that carry a PSS 320, an SSS 325, and/or a physical broadcast channel (PBCH) 330. In some aspects, multiple SSBs 315 are included in an SS burst 310 (e.g., with transmission on different beams), and the PSS 320, the SSS 325, and/or the PBCH 330 may be the same across each SSB 315 of the SS burst 310. In some aspects, a single SSB 315 may be included in an SS burst 310. In some aspects, the SSB 315 may be at least four symbols (e.g., OFDM symbols) in length, where each symbol carries one or more of the PSS 320 (e.g., occupying one symbol), the SSS 325 (e.g., occupying one symbol), and/or the PBCH 330 (e.g., occupying two symbols). In some aspects, an SSB 315 may be referred to as an SS/PBCH block.

In some aspects, the symbols of an SSB 315 are consecutive, as shown in FIG. 3. In some aspects, the symbols of an SSB 315 are non-consecutive. Similarly, in some aspects, one or more SSBs 315 of the SS burst 310 may be transmitted in consecutive radio resources (e.g., consecutive symbols) during one or more slots. Additionally, or alternatively, one or more SSBs 315 of the SS burst 310 may be transmitted in non-consecutive radio resources.

In some aspects, the SS bursts 310 may have a burst period, and the SSBs 315 of the SS burst 310 may be transmitted by a wireless node (e.g., base station 110) according to the burst period. In this case, the SSBs 315 may be repeated during each SS burst 310. In some aspects, the SS burst set 305 may have a burst set periodicity, whereby the SS bursts 310 of the SS burst set 305 are transmitted by the wireless node according to the fixed burst set periodicity. In other words, the SS bursts 310 may be repeated during each SS burst set 305.

In some aspects, an SSB 315 may include an SSB index, which may correspond to a beam used to carry the SSB 315. A UE 120 may monitor for and/or measure SSBs 315 using different receive (Rx) beams during an initial network access procedure and/or a cell search procedure, among other examples. Based at least in part on the monitoring and/or measuring, the UE 120 may indicate one or more SSBs 315 with a best signal parameter (e.g., an RSRP parameter) to a base station 110. The base station 110 and the UE 120 may use the one or more indicated SSBs 315 to select one or more beams to be used for communication between the base station 110 and the UE 120 (e.g., for a random access channel (RACH) procedure). Additionally, or alternatively, the UE 120 may use the SSB 315 and/or the SSB index to determine a cell timing for a cell via which the SSB 315 is received (e.g., a serving cell).

In some aspects, the techniques and apparatuses for RMSI in a DRS for SL-U described herein may utilize an SS hierarchy similar to that described in association with FIG. 3.

As indicated above, FIG. 3 is provided as an example. Other examples may differ from what is described with regard to FIG. 3.

Figure 4:
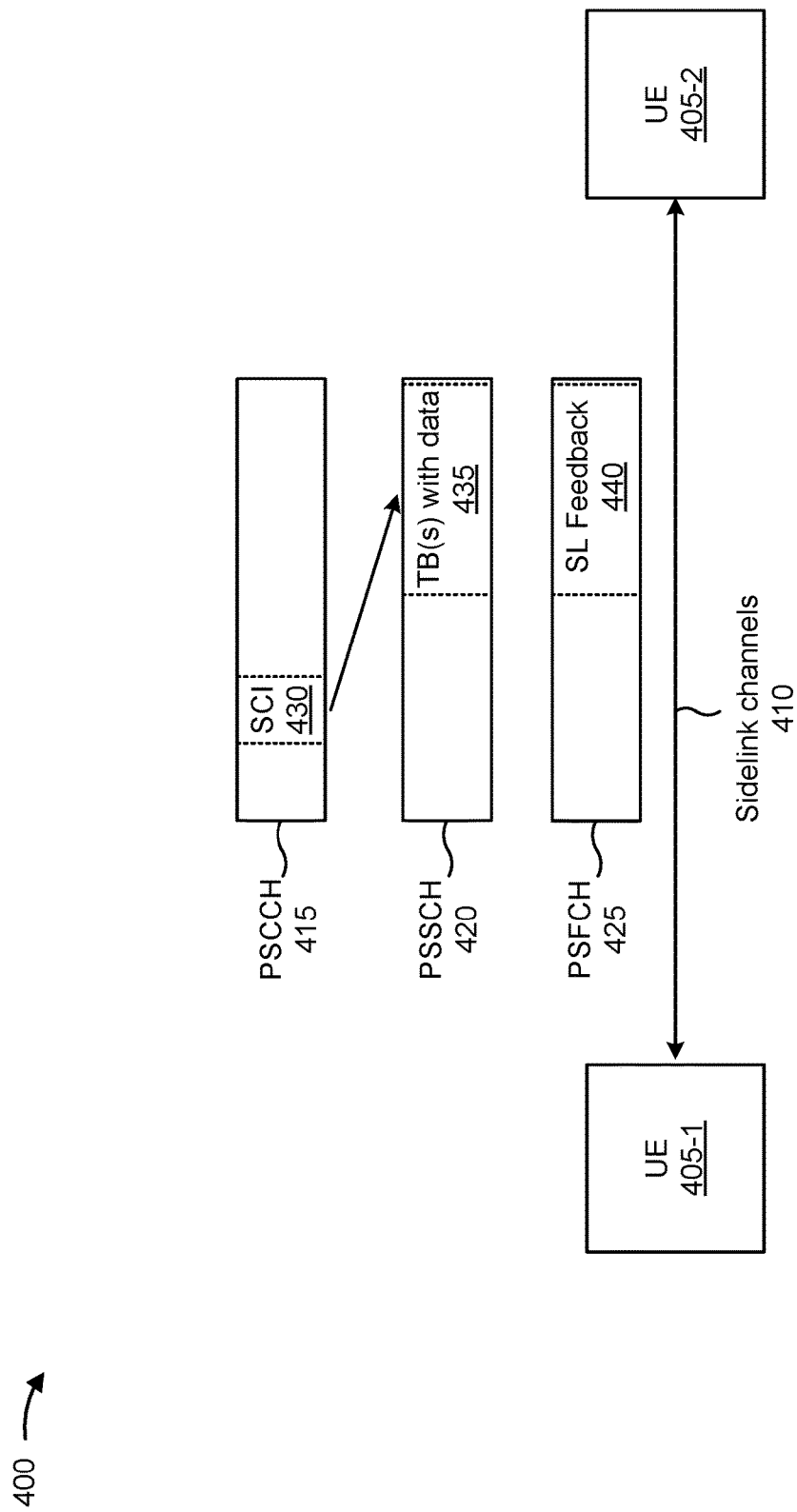
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410, for example, for P2P communications, D2D communications, V2X communications (e.g., which may include V2V communications, V2I communications, and/or V2P communications) and/or mesh networking. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, or symbols) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a base station 110 via an access link or an access channel. The PSSCH 420 may be used to communicate data, similar to a physical downlink shared channel (PDSCH) and/or a physical uplink shared channel (PUSCH) used for cellular communications with a base station 110 via an access link or an access channel. For example, the PSCCH 415 may carry sidelink control information (SCI) 430, which may indicate various control information used for sidelink communications, such as one or more resources (e.g., time resources, frequency resources, and/or spatial resources) where a transport block (TB) 435 may be carried on the PSSCH 420. The TB 435 may include data. The PSFCH 425 may be used to communicate sidelink feedback 440, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 415, in some aspects, the SCI 430 may include multiple communications in different stages, such as a first stage SCI (SCI-1) and a second stage SCI (SCI-2). The SCI-1 may be transmitted on the PSCCH 415. The SCI-2 may be transmitted on the PSSCH 420. The SCI-1 may include, for example, an indication of one or more resources (e.g., time resources, frequency resources, and/or spatial resources) on the PSSCH 420, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 420, such as a HARQ process ID, a new data indicator (NDI), a source identifier, a destination identifier, and/or a channel state information (CSI) report trigger.

In some aspects, the one or more sidelink channels 410 may use resource pools. For example, a scheduling assignment (e.g., included in SCI 430) may be transmitted in subchannels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a sidelink transmission mode (e.g., Mode 1) where resource selection and/or scheduling is performed by a base station 110. For example, the UE 405 may receive a grant (e.g., in downlink control information (DCI) or in a radio resource control (RRC) message, such as for configured grants) from the base station 110 for sidelink channel access and/or scheduling. In some aspects, a UE 405 may operate using a transmission mode (e.g., Mode 2) where resource selection and/or scheduling is performed by the UE 405 (e.g., rather than a base station 110). In some aspects, the UE 405 may perform resource selection and/or scheduling by sensing channel availability for transmissions. For example, the UE 405 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources and/or channel parameters. Additionally, or alternatively, the UE 405 may perform resource selection and/or scheduling by determining a channel busy ratio (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, and/or an MCS to be used for the upcoming sidelink transmission. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

In some aspects, the techniques and apparatuses for RMSI in a DRS for SL-U described herein may be applicable to sidelink communication as described in association with FIG. 4.

As indicated above, FIG. 4 is provided as an example. Other examples may differ from what is described with respect to FIG. 4.

A wireless communication system may support a design for an S-SSB that allows the S-SSB to be multiplexed with a PSSCH and PSCCH in a given slot. Notably, multiplexing an S-SSB with the PSSCH and PSCCH can help the slot satisfy an occupied channel bandwidth (OCB) requirement associated with sidelink operation on an unlicensed band (SL-U). In some scenarios, a single S-SSB is allowed to be transmitted in a given slot, and a 4-symbol NR SSB waveform is used for the S-SSB. Candidate locations for the S-SSB within a given subband are known to a receiver of the S-SSB. Generally, the S-SSB is multiplexed so as to avoid symbols of the PSCCH, an active gain control (AGC) symbol, and DMRS symbols of the PSSCH and SCI-2. Further, the PSSCH is rate matched around resource elements of the S-SSB. Additionally, SCI-1 may carry a one-bit indication that indicates if an S-SSB is transmitted in a slot (so that the receiver can determine a rate matching assumption).

Figure 5:
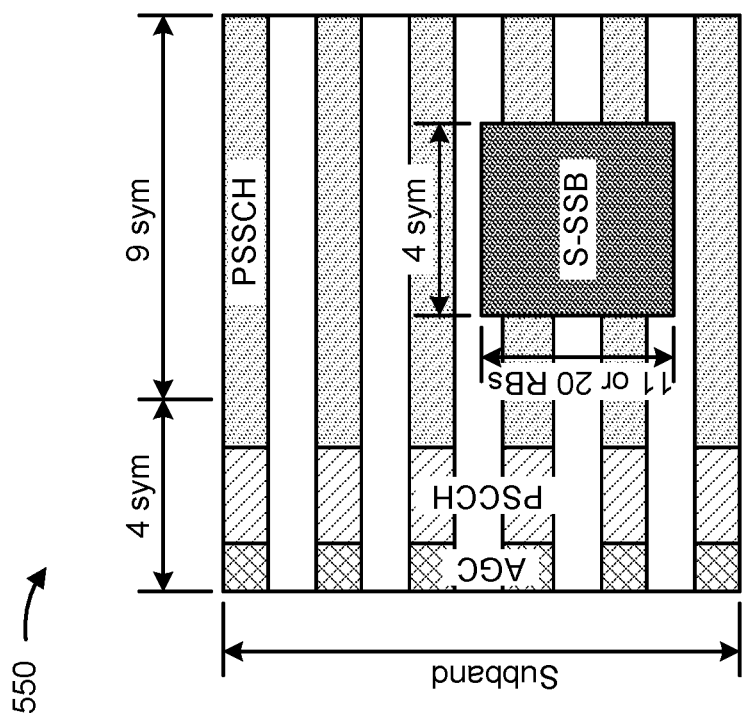
FIG. 5 is a diagram illustrating an examples of multiplexing a sidelink SS block (S-SSB) with a physical sidelink shared channel (PSSCH) and a physical sidelink control channel (PSCCH) in a slot, in accordance with the present disclosure.
Figure 5:
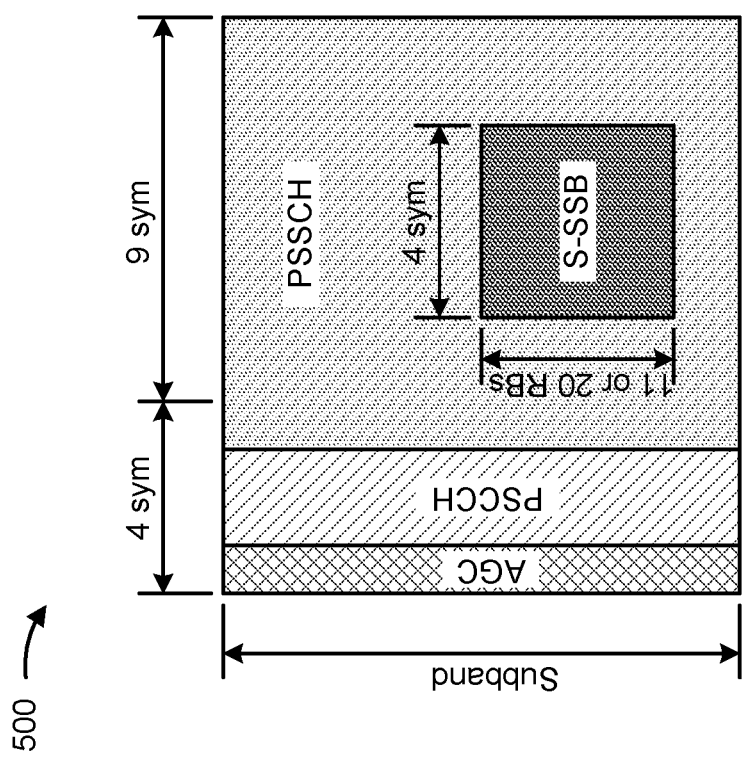

FIG. 5 is a diagram illustrating examples of multiplexing an S-SSB with a PSSCH and a PSCCH in a slot. The left diagram of FIG. 5 is an example of an S-SSB that is multiplexed with a PSCCH/PSSCH that uses a waveform according to which the PSSCH/PSCCH occupies an entire subband of the slot. The right diagram of FIG. 5 is an example of an S-SSB that is multiplexed with a PSCCH/PSSCH that uses an interlaced waveform (e.g., a waveform according to which the PSCCH/PSSCH occupies a subset of frequency interlaces in the slot).

Figure 6:
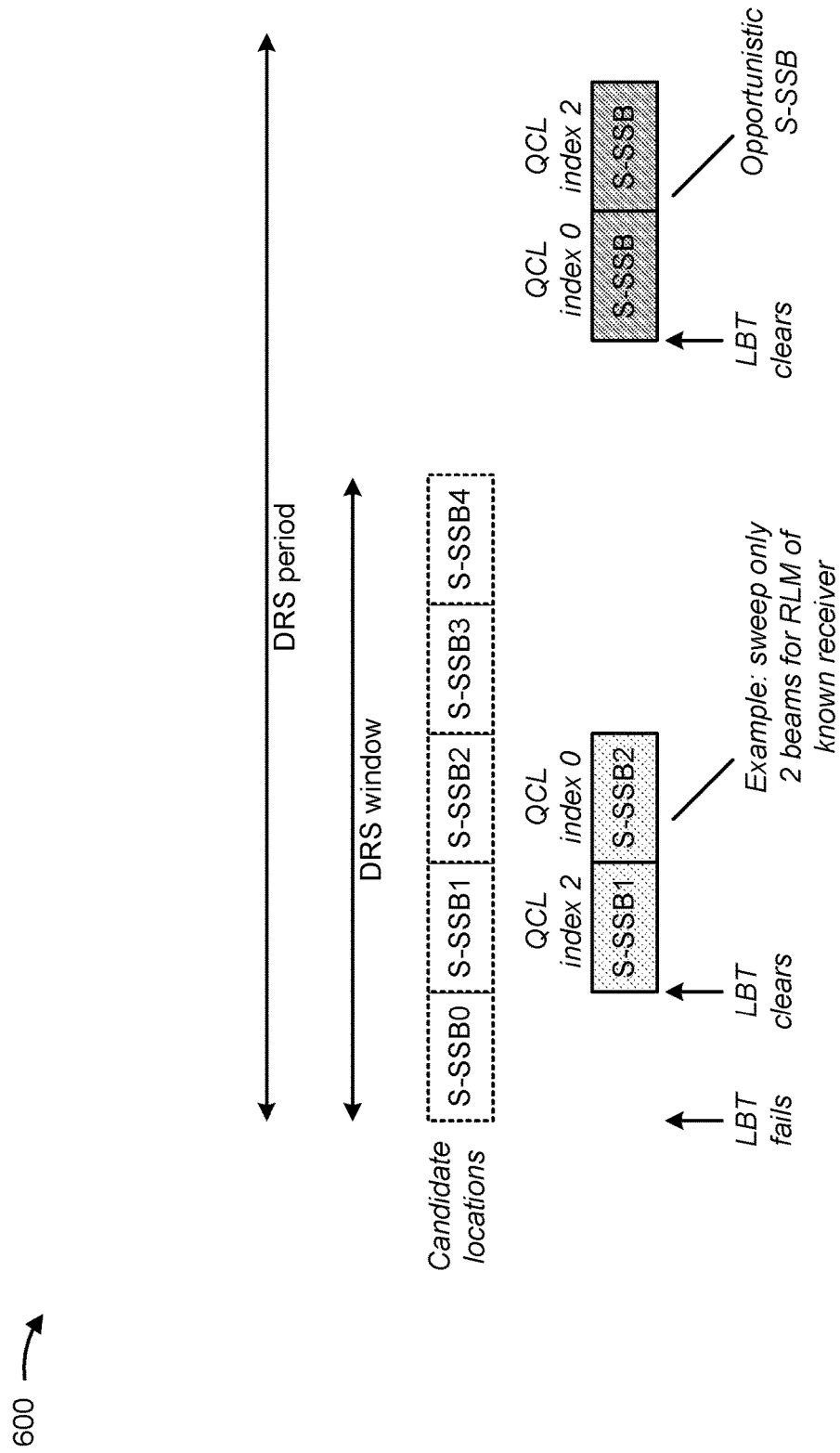
FIG. 6 is a diagram illustrating an example S-SSB transmission in accordance with a periodic discovery reference signal (DRS) window scheme, in accordance with the present disclosure.

Further, the concept of the DRS window and the DRS period (e.g., as described above with respect to FIG. 3) can be applied to S-SSB transmission for SL-U to, for example, facilitate radio link monitoring (RLM) by a receiver. FIG. 6 is a diagram illustrating an example of S-SSB transmission in accordance with a periodic DRS window scheme. Here, dynamic S-SSB transmission using the S-SSB waveform allows a transmitter to dynamically change, for example, a length of a given S-SSB beam sweeping burst, quasi co-location (QCL) indices of S-SSB beams within the given S-SSB beam sweeping burst, or ordering of the QCL indices within the given (contiguous) S-SSB beam sweeping burst. This can allow the transmitter to, for example, sweep comparatively fewer S-SSB beams for RLM or sweep comparatively more S-SSB beams for initial synchronization. For example, as illustrated in FIG. 6, after a listen-before-talk (LBT) procedure clears during a DRS period, the transmitter transmits a first S-SSB (S-SSB1) and a second S-SSB (S-SSB2) in candidate locations of the DRS window. In this example, the transmitter sweeps only the first S-SSB and second S-SSB beams for the purpose of RLM by a known receiver. The transmitter may explicitly indicate (e.g., in SCI or in a physical sidelink broadcast channel (PSBCH)) a QCL index associated with a given S-SSB within an S-SSB beam sweeping burst. For example, as illustrated in FIG. 6, the transmitter may indicate the first S-SSB as being associated with QCL index 2 and may indicate the second S-SSB as being associated with QCL index 0. Notably, in a next DRS window, the transmitter can dynamically change a length of the S-SSB beam sweeping burst, QCL indices of S-SSB beams within the S-SSB beam sweeping burst, or ordering of the QCL indices within the S-SSB beam sweeping burst. Further, the transmitter in some scenarios may utilize opportunistic S-SSB transmission (e.g., S-SSB transmission outside of a DRS window) to increase the speed of link recovery. For example, as illustrated in FIG. 6, the transmitter may dynamically transmit an S-SSB burst in a slot outside of the DRS window. The transmitter can dynamically transmit an S-SSB burst in a slot outside of a DRS window as needed, since the S-SSB can share a resource pool (RP) with the PSSCH (i.e., since the PSSCH and S-SSB can be multiplexed in a given slot). Further, the receiver can be permitted to (dynamically) trigger an S-SSB beam sweep, as needed.

Furthermore, an RB grid and an RB set can be configured for sidelink communications that use an interlaced waveform. The RB grid can be configured via a parameter (e.g., a K_ssb parameter) associated with the PSBCH. An initial RP (or bandwidth part (BWP)) can be configured in the S-SSB containing subband for remaining system information (RMSI), system information block (SIB) communication, initial RRC messages, or fallback sidelink transmission. To support wideband sidelink communication, a wideband RB set can be configured. One technique for configuring a wideband RB set is to utilize an S-SSB transmitter-centric RB set configuration that is signaled via RMSI/SIB, thereby enabling relatively simple wideband RB set configuration for groupcast or broadcast communications. Another technique for configuring a wideband RB set utilizes per-link RB set configuration, which requires RRC messages to be exchanged between the transmitter and the receiver. The per-link RB set configuration can be utilized for, for example, unicast communications. Further, SCI-1 and SCI-2 may rate match in the minimal RB sets among all possible RB set configurations within each subband (e.g., each 20 MHz subband) to allow a receiver to decode SCI-1/SCI-2 when the RB set configuration is unknown. The RB set configuration assumption for decoding a PSSCH can depend on, for example, an identifier of the transmitter or an indication carried in SCI.

In some systems, RMSI can indicate an RB set configuration to be used for wideband transmissions from an S-SSB transmitting sidelink transmitter. However, RMSI can in operation be used to convey an RP configuration that enables two-way communication (e.g., a transmitter-centric RP configuration that a receiver applies for reception and transmission of sidelink communications). Further, in some applications, a sidelink device providing services may transmit a DRS and could include some service-related parameters in RMSI to facilitate a process for discovery of such services. For example, the sidelink device may support services on different subbands, and could transmit an indication of a subband corresponding to each service in RMSI (or in an SIB). However, for SL-U, a receiver of an S-SSB needs to know a location of RMSI after decoding the S-SSB in order to allow two-way communication to be enabled in this way or to enable determination of service-related parameters. Further, in a dense deployment of SL-U nodes, reducing a quantity of S-SSB transmissions is desirable to, for example, reduce iterations of LBT or reduce medium contention.

Some techniques and apparatuses described herein enable communication of RMSI in a DRS for SL-U. In some aspects, a transmitter transmits an S-SSB in a slot and transmits RMSI associated with the S-SSB in a PSSCH that is multiplexed with the S-SSB in the slot. In some aspects, a receiver receives the S-SSB in the slot and receives the RMSI associated with the S-SSB in the PSSCH that is multiplexed with the S-SSB in the slot. In some aspects, a PSCCH multiplexed with the S-SSB in the slot may schedule the RMSI. Additional details are provided below.

In some aspects, a PSCCH and a PSSCH (carrying the RMSI) may be multiplexed in a slot with an S-SSB. The RMSI being frequency-division multiplexed in the slot can in some cases enable an OCB requirement of the S-SSB carrying slot to be satisfied. In some aspects, a PSBCH of the S-SSB may indicate one or more interlaces (or subchannels) where SCI (e.g., SCI-1) that schedules the RMSI is communicated, which can reduce resources consumed by blind decoding or reduce acquisition delay.

Further, in some aspects, the RMSI may carry an RP configuration associated with a service that is supported on another subband (e.g., RMSI may carry RP configuration per service). Here, a DRS could be communicated on an anchor subband. After identifying a service to be utilized based on the DRS, a receiver could move to another RB set based at least in part on the RP configuration in order to access the service that is supported on the other subband. Here, DRS communication on the anchor subband reduces acquisition delay. By allowing RMSI to carry per-service RP configurations, different transmitters could move their RPs used for application communication to different RB sets. Additionally, a given transmitter could move application communication for different services to different RB sets.

Figure 7A:
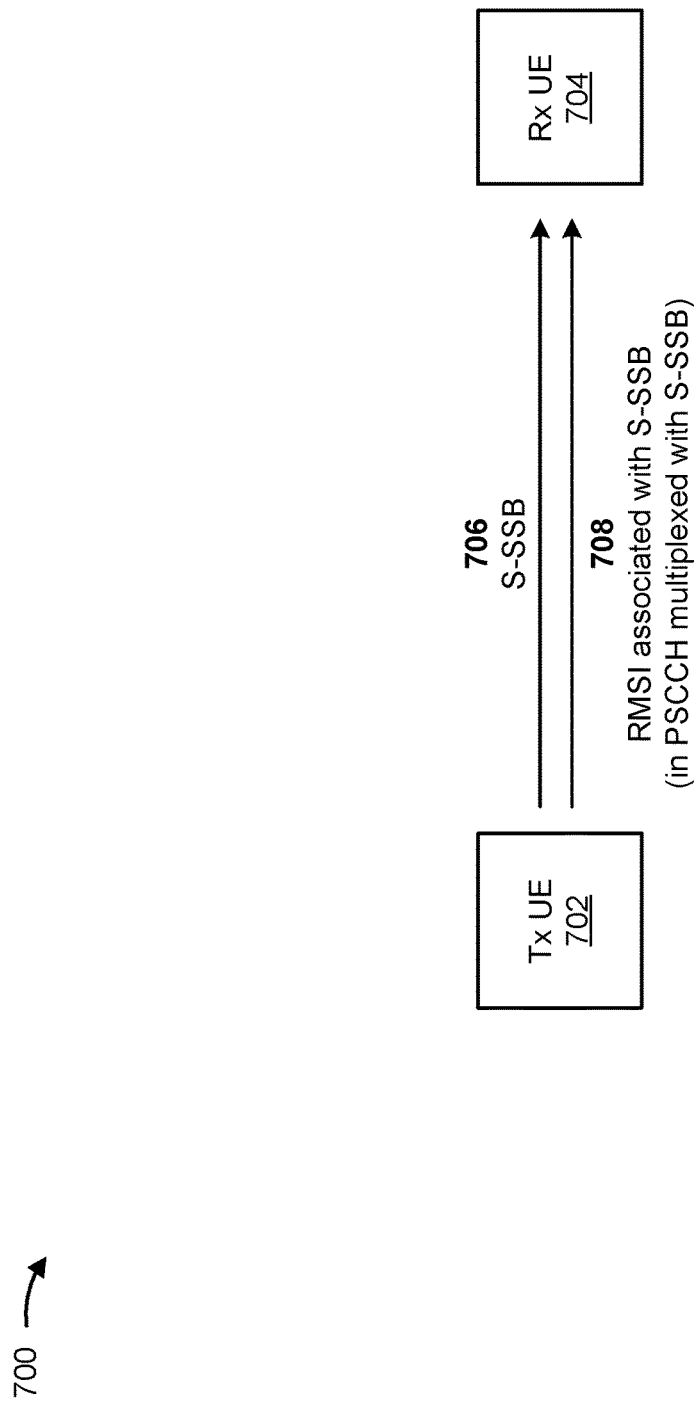
FIGS. 7A-7D are diagrams illustrating examples associated with remaining minimum system information (RMSI) in a DRS for sidelink in an unlicensed band (SL-U), in accordance with the present disclosure.

FIGS. 7A-7D are diagrams illustrating examples associated with RMSI in a DRS for SL-U, in accordance with the present disclosure. As shown in FIG. 7A, a transmitter (Tx) UE 702 (e.g., a first UE 120, a first UE 405, or the like) and a receiver (Rx) UE 704 (e.g., a second UE 120, a second UE 405, or the like) may communicate with one another. In some aspects, the Tx UE 702 and the Rx UE 704 may be included in a wireless network, such as wireless network 100.

As shown by reference 706, the Tx UE 702 may transmit, and the Rx UE 704 may receive, an S-SSB in a slot. Further, as shown by reference 708 the Tx UE 702 may transmit, and the Rx UE 704 may receive, RMSI associated with the S-SSB. In some aspects, the RMSI is multiplexed (e.g., frequency-division multiplexed (FDM) or time-division multiplexed (TDM)) with the S-SSB in the slot. In some aspects, the S-SSB and the RMSI associated with the S-SSB are contained within the slot. That is, in some aspects, the S-SSB and the RMSI associated with the S-SSB are contained within one slot.

In some aspects, the RMSI is transmitted in a PSSCH that is multiplexed with the S-SSB in the slot. That is, in some aspects, the PSSCH multiplexed with the S-SSB in the slot is used to carry the RMSI. In some aspects, the Tx UE 702 may transmit, and the Rx UE 704 may receive, SCI that schedules the RMSI associated with the S-SSB. In some aspects, the SCI may be transmitted/received in a PSCCH that is multiplexed with the S-SSB in the slot. That is, in some aspects, the PSCCH multiplexed with the S-SSB in the slot is used to schedule the RMSI.

In some aspects, the PSSCH may occupy a subset of frequency interlaces in the slot. In some such aspects, the Tx UE 702 may rate match around resource elements of the S-SSB in association with transmitting the PSSCH. In such an aspect, the Rx UE 704 may similarly rate match around resource elements of the S-SSB in association with receiving the PSSCH. Additionally, the Tx UE 702 may in some aspects power de-boost symbols of the PSSCH in the symbols of the S-SSB in association with transmitting the PSSCH. Notably, power de-boosting may be transparent to the Rx UE 704 when, for example, the RMSI is modulated according to a quadrature phase shift keying (QPSK) modulation scheme. In some aspects, rate matching around resources elements of the S-SSB or (in the case of the Tx UE 702) power de-boosting symbols of the PSSCH in the symbols of the S-SSB may facilitate maintenance of phase continuity.

Additionally, or alternatively, in an aspect in which the PSSCH occupies a subset of frequency interlaces of the slot, the Tx UE 702 may rate match the PSSCH around symbols of the S-SSB or to one or more symbols of the slot before to the symbols of the S-SSB in association with transmitting the PSSCH. In such an aspect, the Rx UE 704 may similarly rate match the PSSCH around symbols of the S-SSB or to one or more symbols of the slot before the symbols of the S-SSB in association with receiving the PSSCH.

In some aspects, when the PSSCH occupies a subset of frequency interlaces of the slot, one or more other frequency interlaces of the slot may be allocated for use in communicating another PSSCH. For example, the PSSCH may occupy a first subset of frequency interlaces in the slot, and the Tx UE 702 may allocate a second subset of frequency interlaces in the slot to another PSSCH. In this way, unused frequency interlaces may be allocated to enable other broadcast, groupcast, or unicast PSSCH communications.

In some aspects, the PSSCH may occupy all frequency interlaces in the slot. In such an aspect the Tx UE 702 may rate match the RMSI to the entire subband (e.g., an entire 20 MHz subband) of the slot in association with transmitting the PSSCH. The Rx UE 704 may similarly rate match the RMSI to the entire subband of the slot in association with receiving the PSSCH.

Figure 7B:
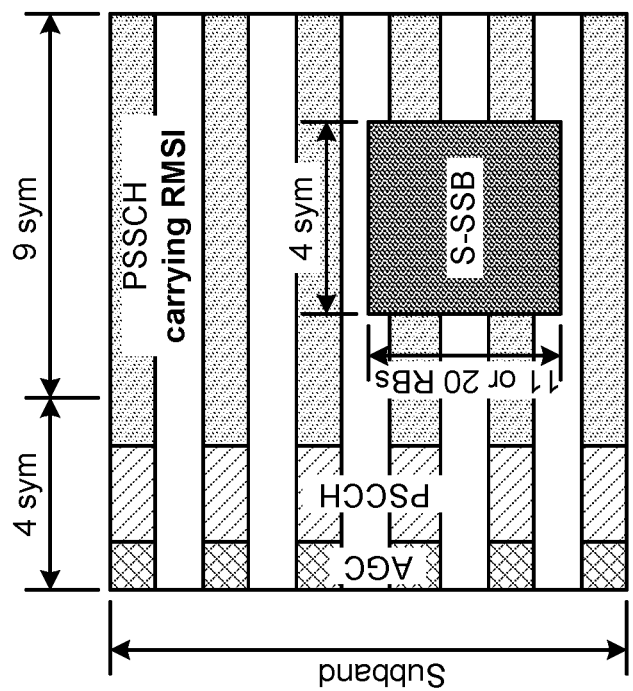
Figure 7B:
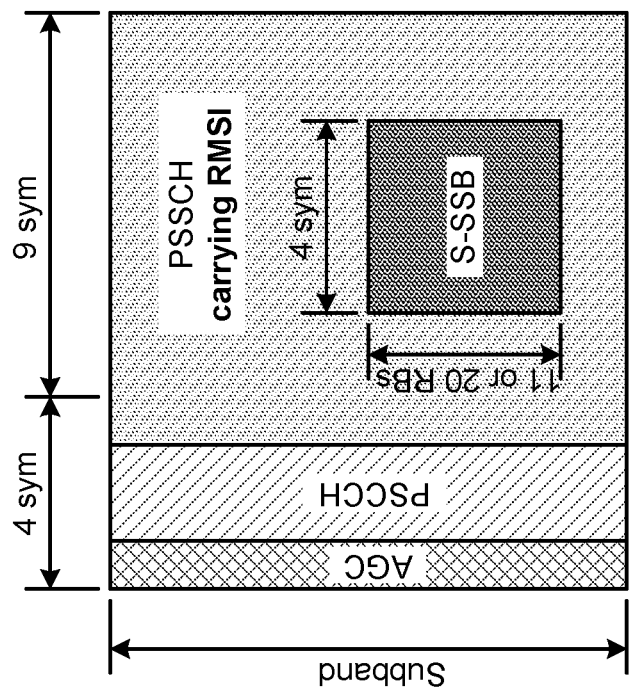
Figure 7C:
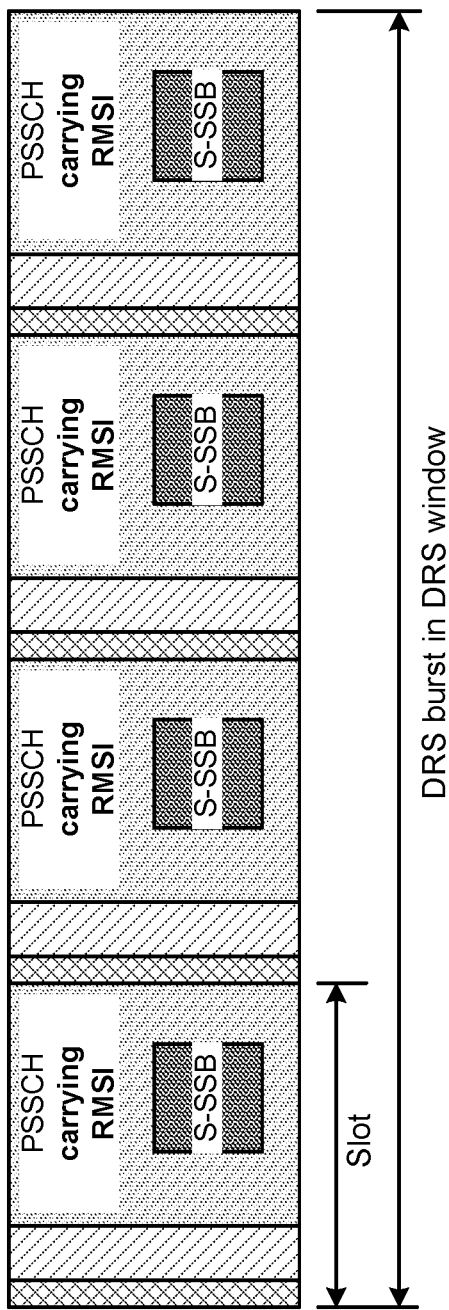

FIG. 7B is a diagram illustrating examples of multiplexing an S-SSB with a PSSCH carrying RMSI in a slot. The left diagram of FIG. 7B is an example of an S-SSB that is multiplexed with a PSCCH carrying RMSI that uses a waveform according to which the PSSCH/PSCCH occupies an entire subband of the slot. The right diagram of FIG. 7B is an example of an S-SSB that is multiplexed with a PSSCH carrying RMSI that uses an interlaced waveform. FIG. 7C is a diagram illustrating an example of a DRS burst comprising a plurality of S-SSBs within a DRS window, where RMSI is transmitted in a PSSCH that is multiplexed with the S-SSB in each slot of the DRS burst.

Notably, there are multiple subchannels or frequency interlaces in the subband in which the S-SSB is communicated. As a result, it may in some scenarios be advantageous for the Rx UE 704 to be capable of determining one or more subchannels or frequency interlaces of the slot in which SCI scheduling the RMSI is to be received. For example, in a baseline scenario, the Rx UE 704 may attempt to decode SCI (e.g., SCI-1) in every subchannel and frequency interlace in the subband where the S-SSB is received. In one particular example of such a scenario, the Rx UE 704 may perform initial acquisition on a first Tx UE 702 that transmits the S-SSB and may monitor PSCCH/PSSCH from a second Tx UE 702 to which the Rx UE 704 is also connected. In this case, the Rx UE 704 needs to monitor SCI-1 in every subchannel or frequency interlace when a configured RP associated with the second Tx UE 702 overlaps the S-SSB slots associated with the first Tx UE 702. However, if the Rx UE 704 is not connected to a second Tx UE 702 as in the above example and, therefore, is not monitoring SCI-1 from the second Tx UE 702, then it may be advantageous for the first Tx UE 702 to indicate which subchannels or frequency interlaces on which to monitor for SCI scheduling RMSI (e.g., to reduce a quantity of blind decoding attempts, reduce power consumption, improve acquisition speed, or the like).

Thus, in some aspects, the Tx UE 702 may transmit, and the Rx UE 704 may receive, an indication of a subchannel or one or more frequency interlaces in the slot in which SCI (e.g., SCI-1) scheduling the RMSI is transmitted. In some aspects, the indication includes one or more interlace indices, wherein an interlace index of the one or more interlace indices identifies a frequency interlace in the slot or a group of frequency interlaces in the slot. In some aspects, the indication is communicated in a master information block (MIB) in a PSBCH of the S-SSB. In some aspects, a quantity of bits needed for the indication is based at least in part on a number of interlaces. As one example, if the subband includes five interlaces, then the indication may be carried in three bits in the MIB to explicitly indicate the interlace(s) carrying the SCI scheduling the RMSI. In some aspects, a coarser indication could be used in order to reduce a size of the indication in the MIB. For example, the subband may include five interlaces divided into a first set of interlaces and a second set of interlaces. Here, the indication may be carried in a single bit in the MIB, to indicate either the first group of interlaces or the second group of interlaces. Notably, in this example, the Rx UE 704 may need to perform blind decoding of SCI-1 through all the interlaces within the indicated group of interlaces. In this way, a quantity of blind decoding attempts, power consumption, and acquisition speed delay can be reduced.

As described above, in some scenarios, RMSI may carry a wideband RB set configuration. In some applications, such as an extended reality (XR) rendering application, a Tx UE 702 supporting the application may be configured to offer a service on a particular sets of subbands. Here, the RMSI may be used deliver an RP configuration for the subband associated with the service, while DRS communication is performed on an anchor subband. That is, the RMSI could communicate an RP configuration and one or more service-related parameters for initial discovery associated with the service. For example, the RMSI could carry an RP configuration to support message exchanges with the Tx UE 702. The RP configuration may include, for example, a PSFCH config, a PSCCH/PSSCH configuration, or an RB set configuration. Here, PSFCH configuration may defines a PSFCH periodicity. The RB set configuration may configure one or more RB sets to be used and associated guard-bands. In some cases, the RB set configuration could indicate a different RB set to support data communication. RMSI utilized in this manner could enable application communication to be moved to different carriers (after initial synchronization on the anchor subband). Further, the Tx UE 702 may support multiple services and may be configured to support the multiple services on different subbands. In some aspects, the RMSI may be used to support such functionality.

Figure 7D:
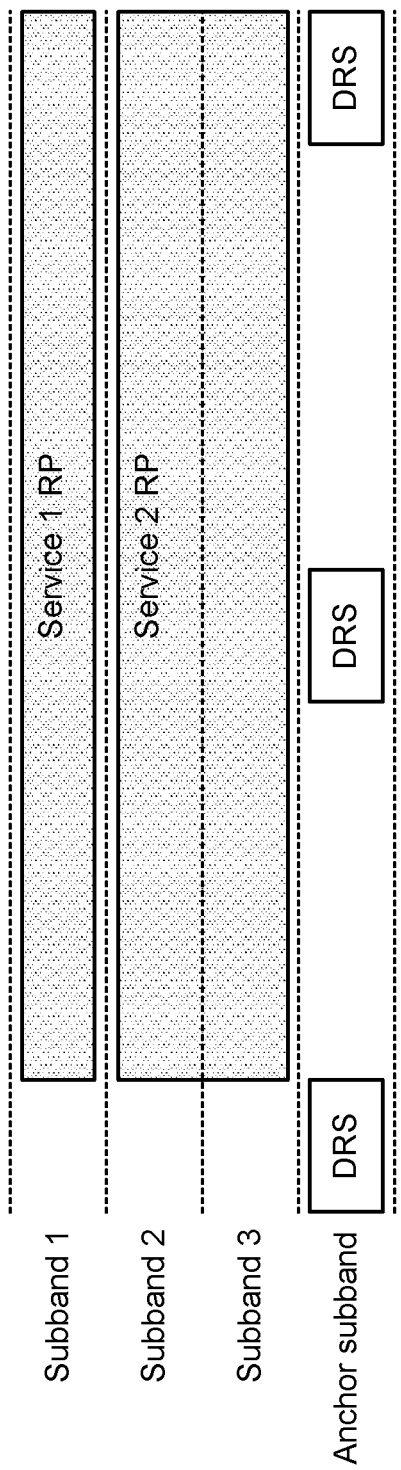

For example, the RMSI may in some aspects include information associated with a service supported on another subband (e.g., a subband other than the subband on which the S-SSB is communicated). Such information may include, for example, an identifier of the service or an RP configuration associated with the service. That is, the RMSI may in some aspects include information associated with different services, such as one or more RP configurations associated with one or more services. As stated above, services supported by the Tx UE 702 may use different RP configurations for communications (e.g., different 20 MHz subbands), while DRS communication is on the anchor subband (e.g., for facilitating fast acquisition). Thus, in some aspects, the RMSI is transmitted in a first subband (e.g., the anchor subband), and the RMSI includes a resource pool configuration associated with a service that is to be supported on a second subband (e.g., a non-anchor subband). FIG. 7D is a diagram illustrative example of a services being supported on different subbands. In FIG. 7D, DRS communication is on the anchor subband, while a first service (Service 1) is supported on a first non-anchor subband (Subband 1) and a second service (Service 2) is supported on a second non-anchor subband (Subband 2) and a third non-anchor subband (Subband 3). In this example, the RMSI received on in the S-SSB (DRS) on the anchor subband may include a first RP configuration associated with the first service (e.g., an RP configuration indicating that Subband 1 is to be used for Service 1) and a second RP configuration associated with the second service (e.g., an RP configuration indicating that Subbands 2 and 3 are to be used for Service 2). In some aspects, enabling support of different services on different subbands utilizing the RMSI in this way may facilitate load balancing of traffic for different services in different subbands.

As indicated above, FIGS. 7A-7D are provided as examples. Other examples may differ from what is described with respect to FIGS. 7A-7D.

Figure 8:
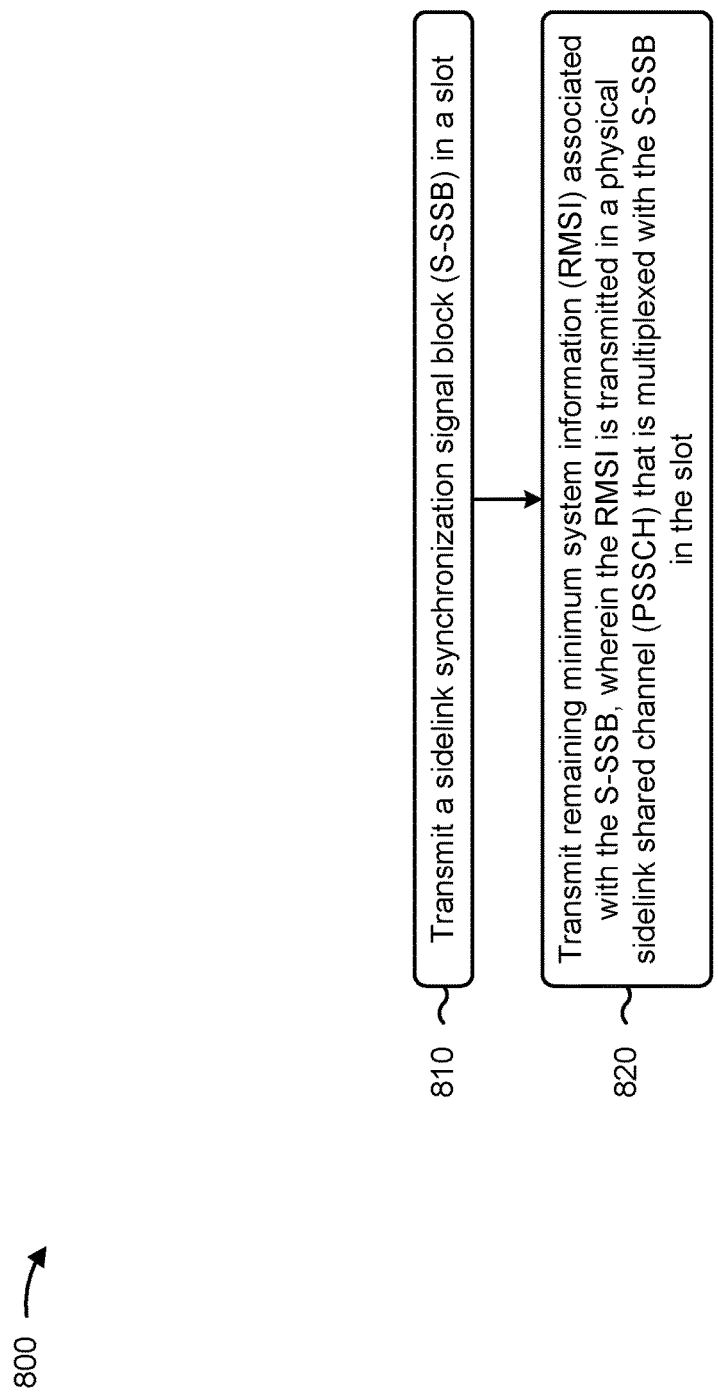
FIGS. 8 and 9 are diagrams illustrating example processes associated with RMSI in a DRS for SL-U, in accordance with the present disclosure.

FIG. 8 is a diagram illustrating an example process 800 performed, for example, by a UE, in accordance with the present disclosure. Example process 800 is an example where the UE (e.g., UE 120) performs operations associated with RMSI in a DRS for SL-U.

As shown in FIG. 8, in some aspects, process 800 may include transmitting an S-SSB in a slot (block 810). For example, the UE (e.g., using communication manager 140 and/or transmission component 1004, depicted in FIG. 10) may transmit an S-SSB in a slot, as described above.

As further shown in FIG. 8, in some aspects, process 800 may include transmitting RMSI associated with the S-SSB, wherein the RMSI is transmitted in a PSSCH that is multiplexed with the S-SSB in the slot (block 820). For example, the UE (e.g., using communication manager 140 and/or transmission component 1004, depicted in FIG. 10) may transmit RMSI associated with the S-SSB, wherein the RMSI is transmitted in a PSSCH that is multiplexed with the S-SSB in the slot, as described above.

Process 800 may include additional aspects, such as any single aspect or any combination of aspects described below and/or in connection with one or more other processes described elsewhere herein.

In a first aspect, process 800 includes transmitting SCI that schedules the RMSI associated with the S-SSB, the SCI being transmitted in a PSCCH that is multiplexed with the S-SSB in the slot.

In a second aspect, alone or in combination with the first aspect, the S-SSB and the RMSI associated with the S-SSB are contained within the slot.

In a third aspect, alone or in combination with one or more of the first and second aspects, the PSSCH occupies a subset of frequency interlaces in the slot, and process 800 further comprises rating matching the PSSCH around symbols of the S-SSB, and power de-boosting symbols of the PSSCH in symbols of the S-SSB.

In a fourth aspect, alone or in combination with one or more of the first through third aspects, the PSSCH occupies a subset of frequency interlaces in the slot, and process 800 further comprises rate matching the PSSCH around symbols of the S-SSB or to one or more symbols of the slot before to the symbols of the S-SSB.

In a fifth aspect, alone or in combination with one or more of the first through fourth aspects, the PSSCH occupies all frequency interlaces in the slot, and process 800 further comprises rate matching the RMSI to an entire subband of the slot.

In a sixth aspect, alone or in combination with one or more of the first through fifth aspects, the PSSCH occupies a first subset of frequency interlaces in the slot, and process 800 further comprises allocating a second subset of frequency interlaces in the slot to another PSSCH.

In a seventh aspect, alone or in combination with one or more of the first through sixth aspects, process 800 includes transmitting an indication of a subchannel or one or more frequency interlaces in the slot in which SCI scheduling the RMSI is transmitted.

In an eighth aspect, alone or in combination with one or more of the first through seventh aspects, the indication is transmitted in a MIB in a PSBCH of the S-SSB.

In a ninth aspect, alone or in combination with one or more of the first through eighth aspects, the indication includes one or more interlace indices, wherein an interlace index of the one or more interlace indices identifies a frequency interlace in the slot or a group of frequency interlaces in the slot.

In a tenth aspect, alone or in combination with one or more of the first through ninth aspects, the RMSI is transmitted in a first subband, and the RMSI includes a resource pool configuration associated with a service that is to be supported on a second subband.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
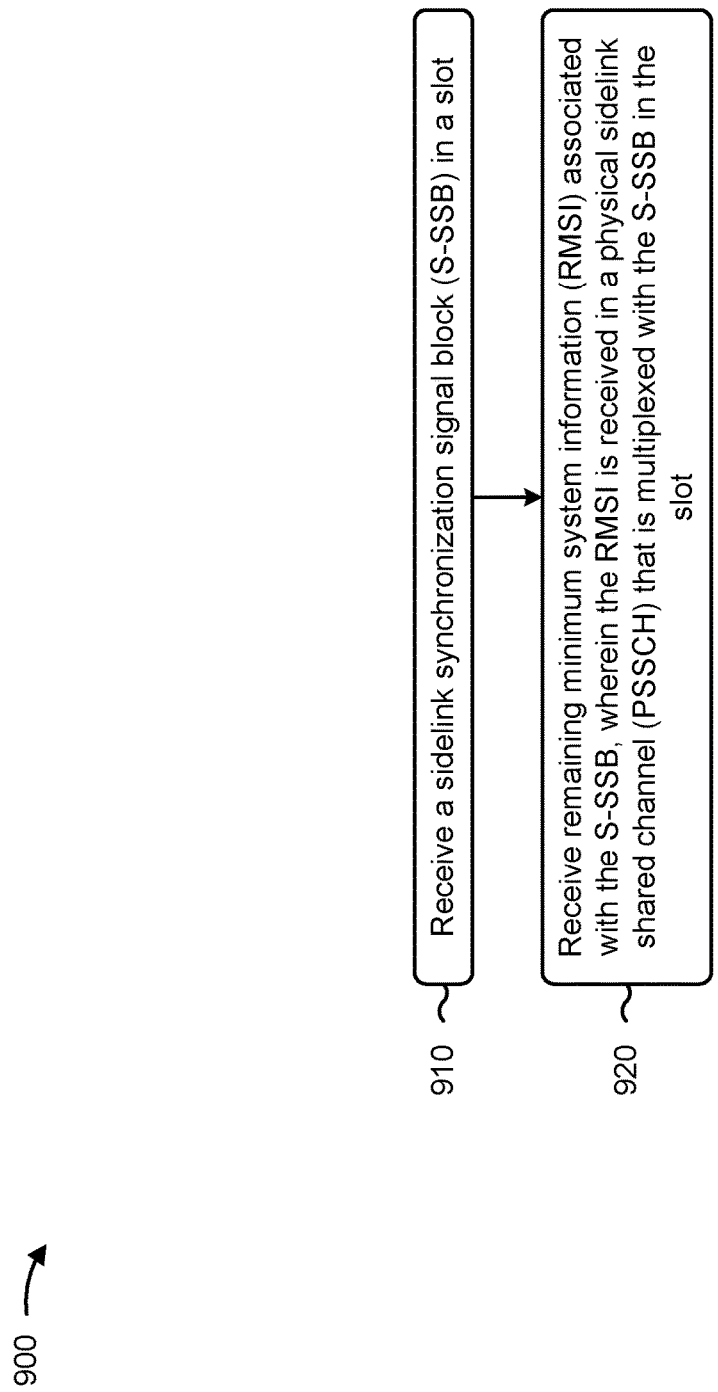

FIG. 9 is a diagram illustrating an example process 900 performed, for example, by a UE, in accordance with the present disclosure. Example process 900 is an example where the UE (e.g., UE 120) performs operations associated with RMSI in a DRS for SL-U.

As shown in FIG. 9, in some aspects, process 900 may include receiving an S-SSB in a slot (block 910). For example, the UE (e.g., using communication manager 140 and/or reception component 1002, depicted in FIG. 10) may receive an S-SSB in a slot, as described above.

As further shown in FIG. 9, in some aspects, process 900 may include receiving RMSI associated with the S-SSB, wherein the RMSI is received in a PSSCH that is multiplexed with the S-SSB in the slot (block 920). For example, the UE (e.g., using communication manager 140 and/or reception component 1002, depicted in FIG. 10) may receive RMSI associated with the S-SSB, wherein the RMSI is received in a PSSCH that is multiplexed with the S-SSB in the slot, as described above.

Process 900 may include additional aspects, such as any single aspect or any combination of aspects described below and/or in connection with one or more other processes described elsewhere herein.

In a first aspect, process 900 includes receiving SCI that schedules the RMSI associated with the S-SSB, the SCI being received in a PSCCH that is multiplexed with the S-SSB in the slot.

Ina second aspect, alone or in combination with the first aspect, the S-SSB and the RMSI associated with the S-SSB are contained within the slot.

In a third aspect, alone or in combination with one or more of the first and second aspects, the PSSCH occupies a subset of frequency interlaces in the slot, and process 900 further comprises rate matching around resource elements of the S-SSB.

In a fourth aspect, alone or in combination with one or more of the first through third aspects, the PSSCH occupies a subset of frequency interlaces in the slot, and process 900 further comprises rate matching the PSSCH around symbols of the S-SSB or to one or more symbols of the slot before the symbols of the S-SSB.

In a fifth aspect, alone or in combination with one or more of the first through fourth aspects, the PSSCH occupies all frequency interlaces in the slot, and process 900 further comprises rate matching the RMSI to an entire subband of the slot.

In a sixth aspect, alone or in combination with one or more of the first through fifth aspects, the PSSCH occupies a first subset of frequency interlaces in the slot, and process 900 further comprises allocating a second subset of frequency interlaces in the slot to another PSSCH.

In a seventh aspect, alone or in combination with one or more of the first through sixth aspects, process 900 includes receiving an indication of a subchannel or one or more frequency interlaces in the slot in which SCI scheduling the RMSI is transmitted.

In an eighth aspect, alone or in combination with one or more of the first through seventh aspects, the indication is received in a MIB in a PSBCH of the S-SSB.

In a ninth aspect, alone or in combination with one or more of the first through eighth aspects, the indication includes one or more interlace indices, wherein an interlace index of the one or more interlace indices identifies a frequency interlace in the slot or a group of frequency interlaces in the slot.

In a tenth aspect, alone or in combination with one or more of the first through ninth aspects, the RMSI is received in a first subband, and the RMSI includes a resource pool configuration associated with a service that is to be supported on a second subband.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
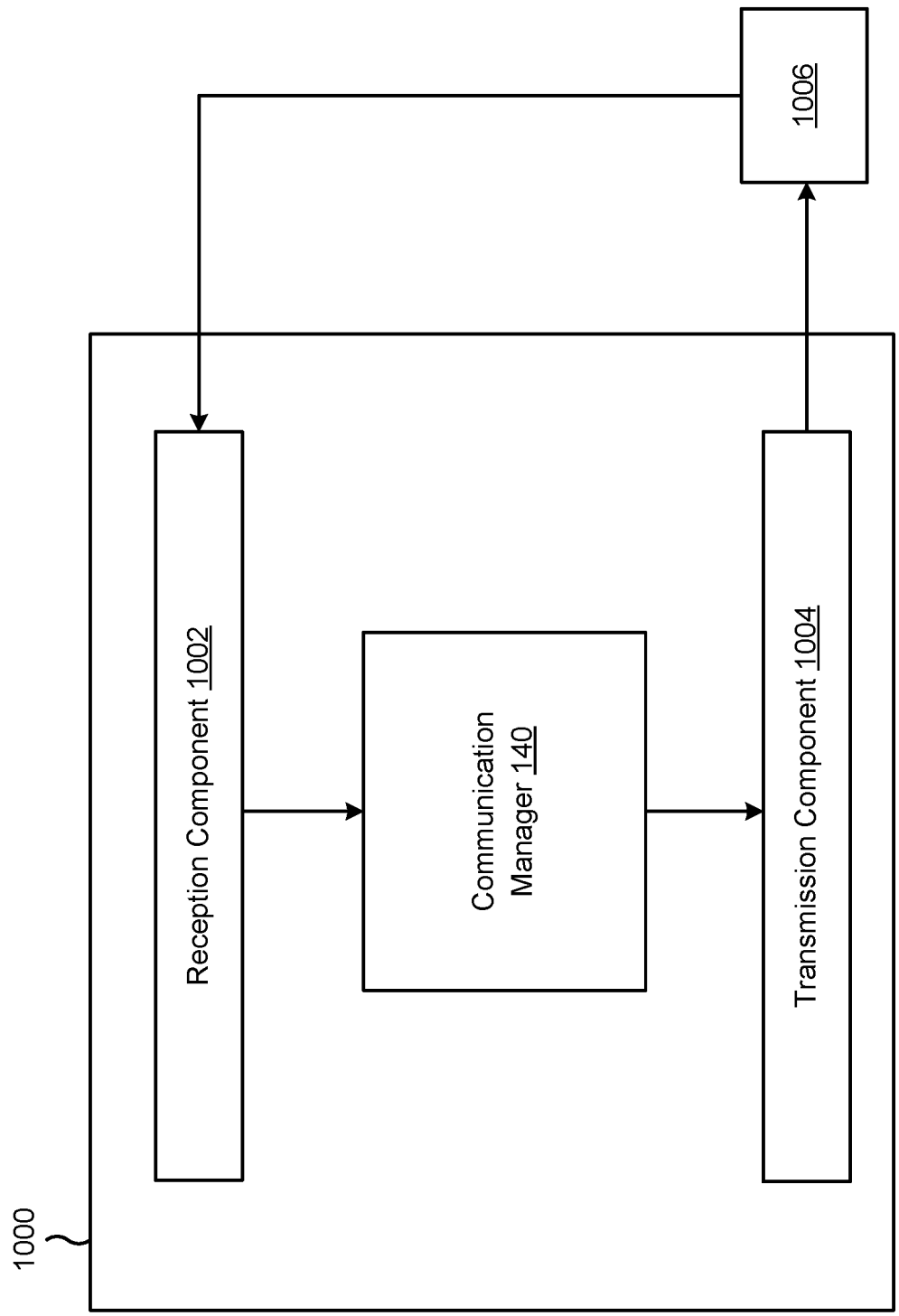
FIG. 10 is a diagram of an example apparatus for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140.

In some aspects, the apparatus 1000 may be configured to perform one or more operations described herein in connection with FIGS. 7A-7D. Additionally, or alternatively, the apparatus 1000 may be configured to perform one or more processes described herein, such as process 800 of FIG. 8, process 900 of FIG. 9, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

In some aspects, the transmission component 1004 may transmit an S-SSB in a slot. The transmission component 1004 may transmit RMSI associated with the S-SSB, wherein the RMSI is transmitted in a PSSCH that is multiplexed with the S-SSB in the slot. The transmission component 1004 may transmit SCI that schedules the RMSI associated with the S-SSB, the SCI being transmitted in a PSCCH that is multiplexed with the S-SSB in the slot. The transmission component 1004 may transmit an indication of a subchannel or one or more frequency interlaces in the slot in which SCI scheduling the RMSI is transmitted.

In some aspects, the reception component 1002 may receive an S-SSB in a slot. The reception component 1002 may receive RMSI associated with the S-SSB, wherein the RMSI is received in a PSSCH that is multiplexed with the S-SSB in the slot. The reception component 1002 may receive SCI that schedules the RMSI associated with the S-SSB, the SCI being received in a PSCCH that is multiplexed with the S-SSB in the slot. The reception component 1002 may receive an indication of a subchannel or one or more frequency interlaces in the slot in which SCI scheduling the RMSI is transmitted.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a UE, comprising: transmitting an S-SSB in a slot; and transmitting RMSI associated with the S-SSB, wherein the RMSI is transmitted in a PSSCH that is multiplexed with the S-SSB in the slot.

Aspect 2: The method of Aspect 1, further comprising transmitting SCI that schedules the RMSI associated with the S-SSB, the SCI being transmitted in a PSCCH that is multiplexed with the S-SSB in the slot.

Aspect 3: The method of any of Aspects 1-2, wherein the S-SSB and the RMSI associated with the S-SSB are contained within the slot.

Aspect 4: The method of any of Aspects 1-3, wherein the PSSCH occupies a subset of frequency interlaces in the slot, and the method further comprises rate matching the PSSCH around symbols of the S-SSB; and power de-boosting symbols of the PSSCH in symbols of the S-SSB.

Aspect 5: The method of any of Aspects 1-4, wherein the PSSCH occupies a subset of frequency interlaces in the slot, and the method further comprises rate matching the PSSCH around symbols of the S-SSB or to one or more symbols of the slot before to the symbols of the S-SSB.

Aspect 6: The method of any of Aspects 1-5, wherein the PSSCH occupies a first subset of frequency interlaces in the slot, and the method further comprises allocating a second subset of frequency interlaces in the slot to another PSSCH.

Aspect 7: The method of any of Aspects 1-3, wherein the PSSCH occupies all frequency interlaces in the slot, and the method further comprises rate matching the RMSI to an entire subband of the slot.

Aspect 8: The method of any of Aspects 1-7, further comprising transmitting an indication of a subchannel or one or more frequency interlaces in the slot in which SCI scheduling the RMSI is transmitted.

Aspect 9: The method of Aspect 8, wherein the indication is transmitted in a MIB in a PSBCH of the S-SSB.

Aspect 10: The method of any of Aspects 8-9, wherein the indication includes one or more interlace indices, wherein an interlace index of the one or more interlace indices identifies a frequency interlace in the slot or a group of frequency interlaces in the slot.

Aspect 11: The method of any of Aspects 1-10, wherein the RMSI is transmitted in a first subband, and the RMSI includes a resource pool configuration associated with a service that is to be supported on a second subband.

Aspect 12: A method of wireless communication performed by a UE, comprising: receiving an S-SSB in a slot; and receiving RMSI associated with the S-SSB, wherein the RMSI is received in a PSSCH that is multiplexed with the S-SSB in the slot.

Aspect 13: The method of Aspect 12, further comprising receiving SCI that schedules the RMSI associated with the S-SSB, the SCI being received in a PSCCH that is multiplexed with the S-SSB in the slot.

Aspect 14: The method of any of Aspects 12-13, wherein the S-SSB and the RMSI associated with the S-SSB are contained within the slot.

Aspect 15: The method of any of Aspects 12-14, wherein the PSSCH occupies a subset of frequency interlaces in the slot, and the method further comprises rate matching around resource elements of the S-SSB.

Aspect 16: The method of any of Aspects 12-15, wherein the PSSCH occupies a subset of frequency interlaces in the slot, and the method further comprises rate matching the PSSCH around symbols of the S-SSB or to one or more symbols of the slot before the symbols of the S-SSB.

Aspect 17: The method of any of Aspects 12-16, wherein the PSSCH occupies a first subset of frequency interlaces in the slot, and the method further comprises allocating a second subset of frequency interlaces in the slot to another PSSCH.

Aspect 18: The method of any of Aspects 12-14, wherein the PSSCH occupies all frequency interlaces in the slot, and the method further comprises rate matching the RMSI to an entire subband of the slot.

Aspect 19: The method of any of Aspects 12-18, further comprising receiving an indication of a subchannel or one or more frequency interlaces in the slot in which SCI scheduling the RMSI is transmitted.

Aspect 20: The method of Aspect 19, wherein the indication is received in a MIB in a PSBCH of the S-SSB.

Aspect 21: The method of any of Aspects 19-20, wherein the indication includes one or more interlace indices, wherein an interlace index of the one or more interlace indices identifies a frequency interlace in the slot or a group of frequency interlaces in the slot.

Aspect 22: The method of any of Aspects 12-21, wherein the RMSI is received in a first subband, and the RMSI includes a resource pool configuration associated with a service that is to be supported on a second subband.

Aspect 23: An apparatus for wireless communication at a device, comprising a processor; memory coupled with the processor; and instructions stored in the memory and executable by the processor to cause the apparatus to perform the method of one or more of Aspects 1-11.

Aspect 24: A device for wireless communication, comprising a memory and one or more processors coupled to the memory, the one or more processors configured to perform the method of one or more of Aspects 1-11.

Aspect 25: An apparatus for wireless communication, comprising at least one means for performing the method of one or more of Aspects 1-11.

Aspect 26: A non-transitory computer-readable medium storing code for wireless communication, the code comprising instructions executable by a processor to perform the method of one or more of Aspects 1-11.

Aspect 27: A non-transitory computer-readable medium storing a set of instructions for wireless communication, the set of instructions comprising one or more instructions that, when executed by one or more processors of a device, cause the device to perform the method of one or more of Aspects 1-11.

Aspect 28: An apparatus for wireless communication at a device, comprising a processor; memory coupled with the processor; and instructions stored in the memory and executable by the processor to cause the apparatus to perform the method of one or more of Aspects 12-22.

Aspect 29: A device for wireless communication, comprising a memory and one or more processors coupled to the memory, the one or more processors configured to perform the method of one or more of Aspects 12-22.

Aspect 30: An apparatus for wireless communication, comprising at least one means for performing the method of one or more of Aspects 12-22.

Aspect 31: A non-transitory computer-readable medium storing code for wireless communication, the code comprising instructions executable by a processor to perform the method of one or more of Aspects 12-22.

Aspect 32: A non-transitory computer-readable medium storing a set of instructions for wireless communication, the set of instructions comprising one or more instructions that, when executed by one or more processors of a device, cause the device to perform the method of one or more of Aspects 12-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
transmit a sidelink synchronization signal block (S-SSB) in a slot; and
transmit remaining minimum system information (RMSI) associated with the S-SSB, wherein the RMSI is transmitted in a physical sidelink shared channel (PSSCH) that is multiplexed with the S-SSB in the slot, wherein the PSSCH occupies a subset of frequency interlaces in the slot, and the one or more processors are further to:
rate match around resource elements of the S-SSB; and
power de-boost symbols of the PSSCH in symbols of the S-SSB.

2. The UE of claim 1, wherein the one or more processors are further to transmit sidelink control information (SCI) that schedules the RMSI associated with the S-SSB, the SCI being transmitted in a physical sidelink control channel (PSCCH) that is multiplexed with the S-SSB in the slot.

3. The UE of claim 1, wherein the S-SSB and the RMSI associated with the S-SSB are contained within the slot.

4. The UE of claim 1, wherein the PSSCH occupies a subset of frequency interlaces in the slot, and the one or more processors are further to rate match the PSSCH around symbols of the S-SSB or to one or more symbols of the slot before to the symbols of the S-SSB.

5. The UE of claim 1, wherein the PSSCH occupies all frequency interlaces in the slot, and the one or more processors are further to rate match the RMSI to an entire subband of the slot.

6. The UE of claim 1, wherein the PSSCH occupies a first subset of frequency interlaces in the slot, and the one or more processors are further to allocate a second subset of frequency interlaces in the slot to another PSSCH.

7. The UE of claim 1, wherein the one or more processors are further to transmit an indication of a subchannel or one or more frequency interlaces in the slot in which sidelink control information (SCI) scheduling the RMSI is transmitted.

8. The UE of claim 7, wherein the indication is transmitted in a master information block (MIB) in a physical sidelink broadcast channel (PSBCH) of the S-SSB.

9. The UE of claim 7, wherein the indication includes one or more interlace indices, wherein an interlace index of the one or more interlace indices identifies a frequency interlace in the slot or a group of frequency interlaces in the slot.

10. The UE of claim 1, wherein the RMSI is transmitted in a first subband, and the RMSI includes a resource pool configuration associated with a service that is to be supported on a second subband.

11. A user equipment (UE) for wireless communication, comprising:
a memory; and
one or more processors, coupled to the memory, configured to:
receive a sidelink synchronization signal block (S-SSB) in a slot; and
receive remaining minimum system information (RMSI) associated with the S-SSB, wherein the RMSI is received in a physical sidelink shared channel (PSSCH) that is multiplexed with the S-SSB in the slot, wherein the PSSCH occupies a subset of frequency interlaces in the slot, and the one or more processors are further to rate match around resource elements of the S-SSB.

12. The UE of claim 11, wherein the one or more processors are further to receive sidelink control information (SCI) that schedules the RMSI associated with the S-SSB, the SCI being received in a physical sidelink control channel (PSCCH) that is multiplexed with the S-SSB in the slot.

13. The UE of claim 11, wherein the S-SSB and the RMSI associated with the S-SSB are contained within the slot.

14. The UE of claim 11, wherein the PSSCH occupies a subset of frequency interlaces in the slot, and the one or more processors are further to rate match the PSSCH around symbols of the S-SSB or to one or more symbols of the slot before the symbols of the S-SSB.

15. The UE of claim 11, wherein the PSSCH occupies all frequency interlaces in the slot, and the one or more processors are further to rate match the RMSI to an entire subband of the slot.

16. The UE of claim 11, wherein the PSSCH occupies a first subset of frequency interlaces in the slot, and the one or more processors are further to allocate a second subset of frequency interlaces in the slot to another PSSCH.

17. The UE of claim 11, wherein the one or more processors are further to receive an indication of a subchannel or one or more frequency interlaces in the slot in which sidelink control information (SCI) scheduling the RMSI is transmitted.

18. The UE of claim 17, wherein the indication is received in a master information block (MIB) in a physical sidelink broadcast channel (PSBCH) of the S-SSB.

19. The UE of claim 17, wherein the indication includes one or more interlace indices, wherein an interlace index of the one or more interlace indices identifies a frequency interlace in the slot or a group of frequency interlaces in the slot.

20. The UE of claim 11, wherein the RMSI is received in a first subband, and the RMSI includes a resource pool configuration associated with a service that is to be supported on a second subband.

21. A method of wireless communication performed by a user equipment (UE), comprising:
transmitting a sidelink synchronization signal block (S-SSB) in a slot; and
transmitting remaining minimum system information (RMSI) associated with the S-SSB, wherein the RMSI is transmitted in a physical sidelink shared channel (PSSCH) that is multiplexed with the S-SSB in the slot, wherein the PSSCH occupies a subset of frequency interlaces in the slot, and the method further comprises:

rate matching around resource elements of the S-SSB; and
power de-boosting symbols of the PSSCH in symbols of the S-SSB.

22. The method of claim 21, further comprising transmitting sidelink control information (SCI) that schedules the RMSI associated with the S-SSB, the SCI being transmitted in a physical sidelink control channel (PSCCH) that is multiplexed with the S-SSB in the slot.

23. The method of claim 21, wherein the S-SSB and the RMSI associated with the S-SSB are contained within the slot.

24. A method of wireless communication performed by a user equipment (UE), comprising:
  receiving a sidelink synchronization signal block (S-SSB) in a slot; and
  receiving remaining minimum system information (RMSI) associated with the S-SSB, wherein the RMSI is received in a physical sidelink shared channel (PSSCH) that is multiplexed with the S-SSB in the slot, wherein the PSSCH occupies a subset of frequency interlaces in the slot, and the one or more processors are further to rate match around resource elements of the S-SSB.

25. The method of claim 24, further comprising receiving sidelink control information (SCI) that schedules the RMSI associated with the S-SSB, the SCI being received in a physical sidelink control channel (PSCCH) that is multiplexed with the S-SSB in the slot.

26. The method of claim 24, wherein the S-SSB and the RMSI associated with the S-SSB are contained within the slot.

\* \* \* \* \*